Patented Oct. 20, 1925.

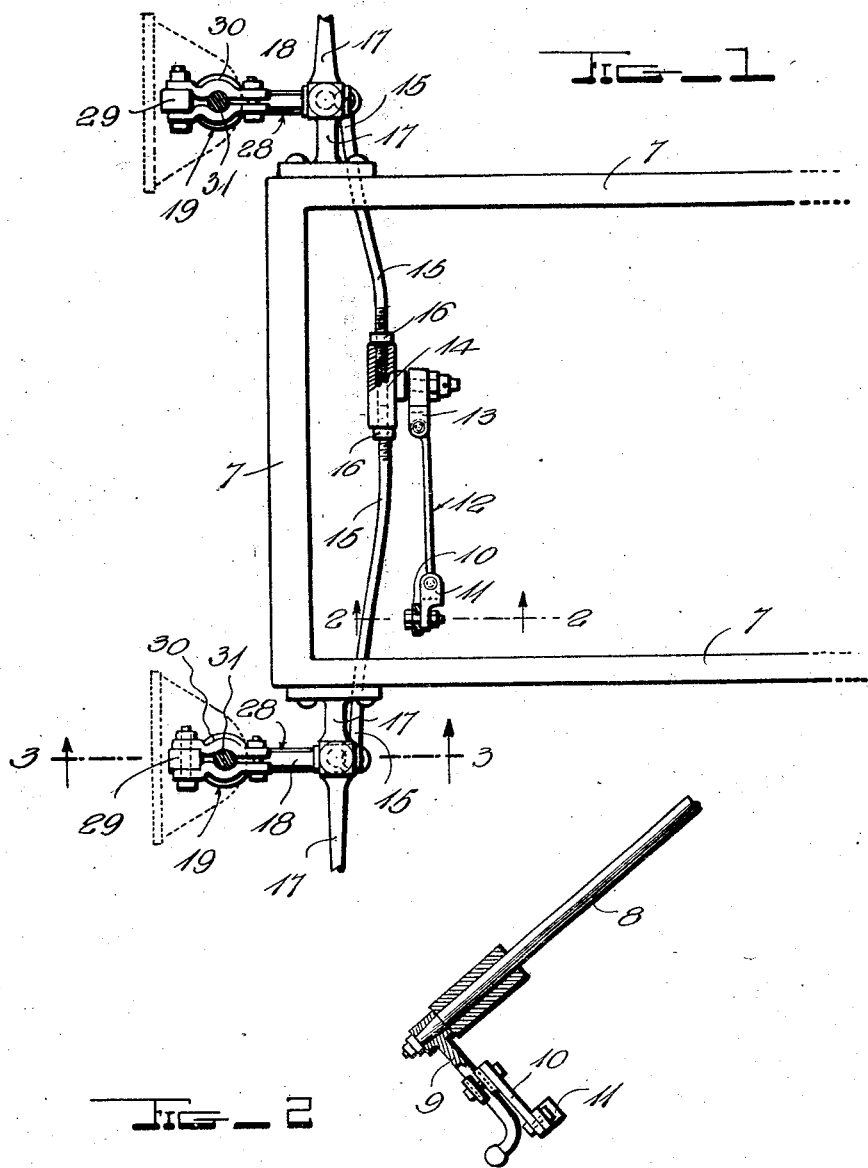

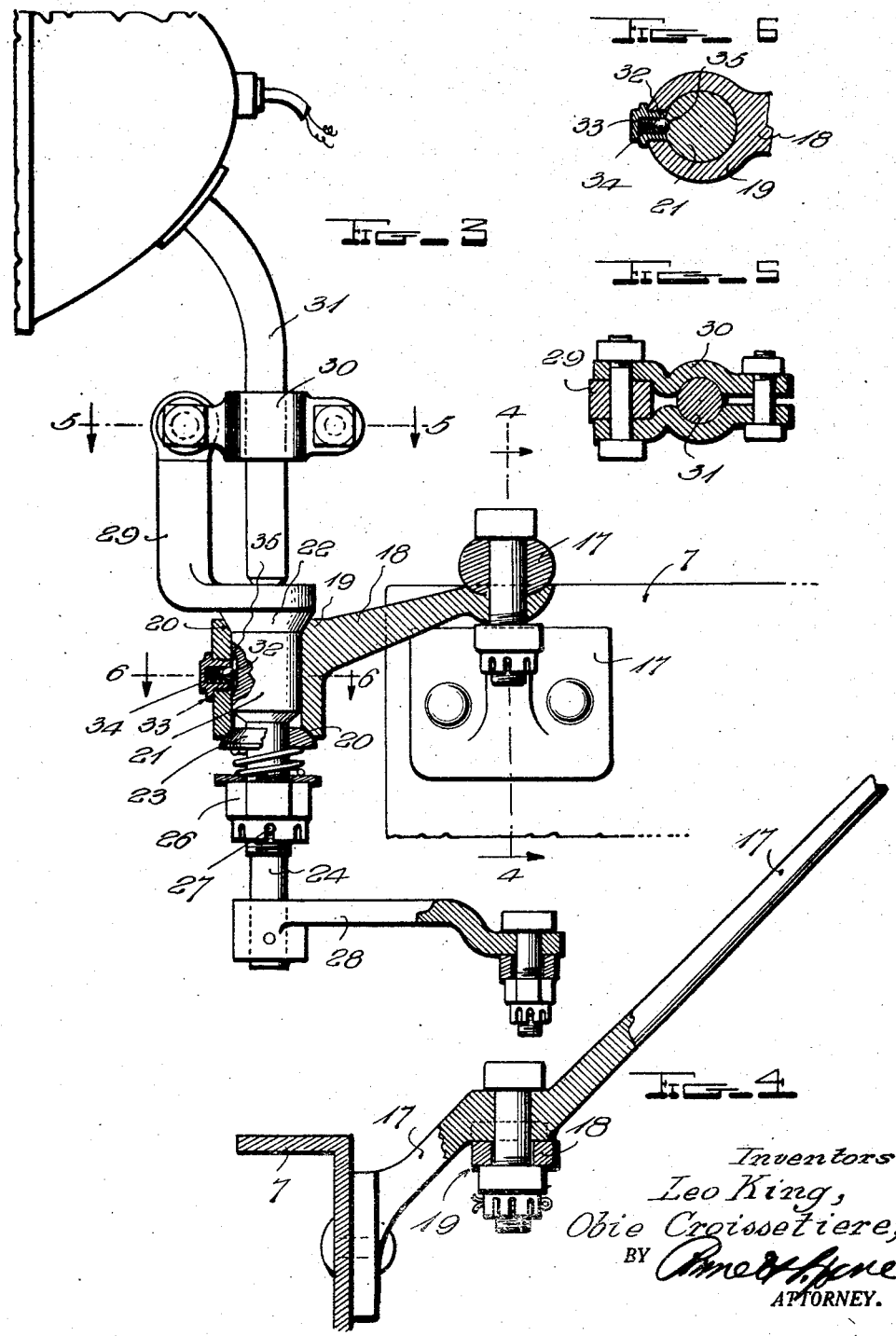

1,557,939

UNITED STATES PATENT OFFICE.

LEO KING AND OBIE CROISSETIERE, OF SAULT STE. MARIE, MICHIGAN.

DIRIGIBLE HEADLIGHT.

Application filed August 4, 1924. Serial No. 730,060.

*To all whom it may concern:*

Be it known that we, LEO KING and OBIE CROISSETIERE, both citizens of the United States, residing at Sault Ste. Marie, in the county of Chippewa and State of Michigan, have invented new and useful Improvements in Dirigible Headlights, of which the following is a specification.

This invention relates to dirigible headlight apparatus, the primary object of the invention being to provide means of an improved and simplified nature whereby the headlights of a motor vehicle will be caused to turn simultaneously with the operation of the steering wheels thereof to direct their rays in the path to be taken by the vehicle.

A further object of the invention is to provide mechanism of the character and for the purpose set forth, which is featured by simplicity of construction of the lamp mounting and connections, as well as simplicity of operation and manner in which the operative parts of the device are associated with the steering column of the vehicle.

A still further object of the invention is to provide an improved mounting for the lamp standard which precludes rattling or wabbling of the same due to wear, and which maintains the lamp in semi-fixed position when the latter is directed to follow a straight away course.

A still further object of the invention is to provide apparatus of this type wherein the application of the same to standard vehicles may be made without the necessity of alteration, change or replacement of any of the parts thereof, and which when once installed requires little or no attention.

With these and other objects in view, the invention consists of the features of construction, combination and arrangement of parts, hereinafter fully described and claimed, reference being had to the accompanying drawings, in which:—

Figure 1 is a plan view of the front portion of the running gear apparatus of a conventional type of motor vehicle and illustrating as applied thereto dirigible headlight apparatus constructed in accordance with the invention, Figure 2 is a sectional view taken substantially upon line 2—2 of Figure 1, Figure 3 is an enlarged elevation, parts in section, of the lamp mounting, Figure 4 is a view taken substantially on line 4—4 of Figure 3, Figure 5 is a sectional view taken upon line 5—5 of Figure 3, and Figure 6 is a similar view taken upon line 6—6 of Figure 3.

Referring now more particularly to the drawings, the running gear frame of the vehicle is indicated generally at 7, and this frame, as will be understood, is equipped with the usual axle and steering wheels and apparatus for moving the latter (not shown), with which is associated the mechanism, hereinafter specified, for operating the headlights of the vehicle. The steering column for the vehicle is indicated at 8, and is equipped at its lower end with the usual arm 9 which operates the mechanism, not shown, for causing the steering wheels of the vehicle to move, and to the arm 9 is secured a bracket 10 to the other end of which is pivotally secured the inner end of a link 12, by means of the coupling 11. The link 12 extends substantially horizontally beneath the frame 7 and is connected at its inner end to a bracket 13 to which is connected a block 14. This block is in the form of a cuff or sleeve and is internally threaded to receive the inner threaded ends of oppositely disposed shaft sections 15, while the lock or jam nuts 16 at each end of the block lock the sleeve or block 14 against movement. From this construction it will be understood that the block 14 is capable of adjustment longitudinally upon the rod ends 15 and that once it has been properly adjusted the lock nuts 16 may be tightened to securely hold the same against further movement. The link 12 is preferably connected to the brackets 13 and 11 by universal joints, so that the same may adjust itself to movements of the running gear frame relative to the steering post.

The fender brace of the vehicle is indicated generally at 17, and to the outer end of this brace is secured an arm 18 forming part of bracket 19. The bracket 19 is in the form of a sleeve having its axis disposed vertically, the upper and lower ends of which are tapered or beveled as at 20. The sleeve 19 receives rotatably therein a head 21, the upper end of which is enlarged and provides a beveled surface 22 to rest snugly upon the surface 20 and to form a taper fit therewith. A beveled collar 23 encircles the lower end of the shaft 24 depending from the head 21, and an expansion spring 25 maintains the said collar in snug fit with the lower surface 20 of bracket 19. A nut 26 threaded upon the shaft 24 forms an abutment for the lower end of spring 25, and this nut may be held in various positions of adjustment by a suitable pin indicated at 27. The lower extremity of the shaft 24 has connected thereto an arm 28 the outer end of which pivotally connects with the corresponding end of the rod 15 above-described.

The head 21 has an arm 29 slightly offset therefrom and disposed in parallel relation therewith, and the upper end of this arm is equipped with a rearwardly projecting clamping member or bracket 30 to receive and tightly hold a lamp standard 31. The standard may extend down through the bracket and rest at its lower end upon the head 21.

Arranged in the bracket or sleeve 19 at such point as to engage and yieldably rock with the head 21 when the latter is in such position that the light rays will be directed in the straight path in advance of the vehicle, is a ball key indicated at 32. The ball is housed within a suitable cup 33 screwed into the bracket or sleeve 19, and the spring 34 maintains the said ball normally at the limit of its inward travel. This ball is adapted to thus "snap" into a recess 35 formed in the exterior surface of head 21.

It will be understood that a lamp bracket and associated mechanism as above-described will be arranged upon each side of the vehicle, and that each end of the rod 15 will be connected with one of these lamp mechanisms. Under normal conditions, or when the vehicle is running in a straight away course, the ball keys 32 will be engaged in the recesses 35 in the heads 21, whereby the lamp standards will be maintained against wabbling or rattling in a direct forward position. When the vehicle is to be steered to the right or to the left, rotation of the steering column will cause the bracket 11 to operate upon the link 12 in such manner as to cause a proper movement of the rod sections 15 in such direction as to operate upon the lamp supporting mechanism so as to cause the lamp standard to rotate in such direction that the rays emanating from the lamps will follow the course to be traversed by the vehicle. The lamp standard steering head is especially constructed to compensate for any wear, and from the structure above-described it is apparent that this head is self-adjusting. The tension of the spring 25 may, from time to time, be adjusted by operating the nut 26.

From the foregoing it is apparent that I have provided dirigible headlight apparatus which is simple of construction, application and operation, which needs no attention after once being properly installed upon a vehicle, which requires the exercise of no special skill or tools in applying the same, and which by reason of its particular construction is practically immune from breakage or derangement. The invention as set forth herein typifies a preferred embodiment thereof, however, it will be understood that variations in the minor details of construction and assemblage of parts may be resorted to if desired without departing from the invention as defined by the claims.

Having thus fully described the invention, what is claimed is:

1. In a dirigible headlight, a bracket, a sleeve carried by said bracket, a head rotatable in the sleeve, said head and sleeve having beveled contact surfaces at their upper ends holding the head from downward movement, a spring-pressed abutment upon the head engaging the lower end of the sleeve, an arm at the upper end of the head offset therefrom and lying in a vertical plane parallel therewith, a clamp extending laterally from said arm, a lamp having a standard depending therefrom parallel with the arm and engaged by the clamp and resting at its lower end upon the head, and means connected with the head for imparting rotary motion thereto and to the lamp.

2. In a dirigible headlight, a bracket, a sleeve carried by the bracket and having beveled surfaces at its upper and lower ends, a shaft having a head portion journaled in said sleeve and provided with a beveled upper surface resting upon the beveled upper surface of the sleeve, a spring-pressed abutment on the shaft engaging the beveled lower surface of the sleeve, the portion of the head enclosed within the sleeve being provided with a recess, a spring-pressed ball check on the sleeve engaging said recess, an arm projecting upwardly from the head and offset from but lying in a plane parallel therewith, a clamp carried by said arm, a lamp having a standard projecting downwardly therefrom parallel with the arm and engaged by the clamp and resting at its lower end on the head, and means connected with the shaft for imparting rotary motion thereto and to the lamp.

In testimony whereof we affix our signatures.

LEO KING.
OBIE CROISSETIERE.